(12) United States Patent
Kadowaki (10) Patent No.: US 11,540,501 B2
(45) Date of Patent: Jan. 3, 2023

(54) BAIT HOOKING DEVICE

(71) Applicant: Akira Kadowaki, Narita (JP)

(72) Inventor: Akira Kadowaki, Narita (JP)

( * ) Notice: Subject to any disclaimer, the term of this patent is extended or adjusted under 35 U.S.C. 154(b) by 132 days.

(21) Appl. No.: 17/255,666

(22) PCT Filed: Sep. 9, 2019

(86) PCT No.: PCT/JP2019/036862
§ 371 (c)(1),
(2) Date: Dec. 23, 2020

(87) PCT Pub. No.: WO2020/071141
PCT Pub. Date: Apr. 9, 2020

(65) Prior Publication Data
US 2021/0267184 A1 Sep. 2, 2021

(30) Foreign Application Priority Data
Oct. 4, 2018 (JP) .............................. JP2018199558

(51) Int. Cl.
*A01K 97/04* (2006.01)
*A01K 97/00* (2006.01)
(52) U.S. Cl.
CPC ............ *A01K 97/045* (2013.01); *A01K 97/00* (2013.01)
(58) Field of Classification Search
CPC .............................. A01K 97/00; A01K 97/045
See application file for complete search history.

(56) References Cited

U.S. PATENT DOCUMENTS 2,885,814 A * 5/1959 Schlador ................ A01K 97/00
D28/40
2,929,166 A * 3/1960 Sneide ................... A01K 97/00
294/99.2

(Continued)

FOREIGN PATENT DOCUMENTS

| JP | H657174 U | 8/1994 |
| JP | 2005168373 A | 6/2005 |
| JP | 6281766 B2 | 2/2018 |

OTHER PUBLICATIONS

Chinese Office Action dated Apr. 22, 2022 in counterpart Chinese application 201980042353.9, 6 pages in Chinese and 4 pages in English.

*Primary Examiner* — Richard G Davis
(74) *Attorney, Agent, or Firm* — Juan Carlos A. Marquez; Marquez IP Law Office PLLC (57) ABSTRACT

The project of the present disclosure is to provide a measure for easily putting an earthworm and the like onto a fishhook without causing a finger to touch the earthworm.
[Solution] A bait hooking device 1 is provided with: a first clamping component 2 having a first clamping portion 23 and a fishhook guide member on the front end side 2b, wherein the first clamping component 2 is connected with the start end side 2a to enable opening and closing by a shaft; a second clamping component 3 provided with a second clamping portion 33 on the front end side 3b; a guide rod 41 provided between the first clamping component 2 and the second clamping component 3 and running through a bait clamped to the first clamping portion 23 and the second clamping portion 33, so as to be clamped to a fishhook guided by the fishhook guide member; and a bait moving component 5 having a pressing portion 52 close to the guide rod 41 and causing the pressing portion 52 to move along the guide rod 41 to the fishhook side.

12 Claims, 7 Drawing Sheets

(56) References Cited

U.S. PATENT DOCUMENTS

| | | | | |
|---|---|---|---|---|
| 3,164,067 | A | * | 1/1965 | Hurst ............... A01K 97/00 43/4 |
| 3,975,853 | A | * | 8/1976 | Aaron ............... A01K 97/00 43/4 |
| 4,073,083 | A | * | 2/1978 | Davis ............... A01K 97/00 43/4 |
| 4,706,403 | A | * | 11/1987 | Reynolds ........... A01K 97/00 43/4 |
| 4,848,019 | A | * | 7/1989 | Toogood ............ A01K 97/00 43/4 |
| 4,915,631 | A | * | 4/1990 | Robinson ........... A01K 97/18 43/4 |
| 4,979,326 | A | * | 12/1990 | Aaron ............... A01K 97/18 43/4 |
| 5,090,097 | A | * | 2/1992 | Koester, Jr. ........ A01K 97/00 43/42.43 |
| 5,125,180 | A | * | 6/1992 | Dean ................ A01K 97/00 43/4 |
| 5,155,930 | A | * | 10/1992 | Monarez ............ A01K 97/04 43/4 |
| 5,367,814 | A | * | 11/1994 | Petersen ............ A01K 97/00 43/4 |
| 5,735,071 | A | * | 4/1998 | Gouldie ............. A01K 97/00 7/106 |

* cited by examiner

BAIT HOOKING DEVICE

TECHNICAL FIELD

The present disclosure relates to a bait hooking device that hooks a live bait such as an earthworm and a seaworm on a fishhook during fishing.

BACKGROUND

During fishing, especially during fishing with a bait, live earthworms, seaworms and other small animals are often pierced into a fishhook and fixed for use. The operations of piercing these live small animals into a curved fishhook are complicated. In addition, there are many people resisting touching these small animals directly with their fingers. As a conventional method, there is a method below: pinching an earthworm with fingers, piercing the earthworm with an injection needle-like guide tube, and hooking the front end of a needle portion of the fishhook on the front end of the guide tube to cause the pierced earthworm to move towards the fishhook, thus cutting through the earthworm by the fishhook for mounting (referring to Patent literature 1). In addition, a method for pressing an earthworm and the like against a bent component with a concave surface (referring to Patent literature 2), a method for arranging a bait pressing plate that presses a live bait, and the like (referring to Patent literature 3) are also known.

PRIOR ART LITERATURE

Patent Literature

Patent literature 1: Japanese Patent Publication No. 6-57174 bulletin
Patent literature 2: Japanese Patent Publication No. 2005-168373 bulletin
Patent literature 3: Japanese Patent No. 6281766

SUMMARY

Problems to be Solved by the Invention

In order to hook a bait such as an earthworm on a fishhook, the earthworm needs to be pinched with fingers, and is pierced to an injection needle-like guide tube (Patent literature 1). In addition, in a method for constraining the earthworm and the like on a bent board for piercing (Patent literature 2), or in a method for piercing the earthworm into a fishhook for fixing in case of constraining with a pressing plate (Patent literature 3), it takes time to pierce the earthworm to the fishhook when the earthworm is pinched with the fingers or tweezers and carried. No matter which method is used, the bait hooking operation is a tedious operation with the sense of resistance for many people. The present disclosure is directed to solve these problems.

Measures for Solving the Problems

A bait hooking device of the present disclosure is characterized by being provided with:
  a first clamping component having a first clamping portion and a fishhook guide member on the front end side,
  a second clamping component connected with the first clamping component and the start end side to enable opening and closing by a shaft and provided with a second clamping portion on the front end side,
  a guide rod provided between the first clamping component and the second clamping component and maintaining a bait, clamped to the first clamping portion and the second clamping portion, moving forward in a manner of being clamped with a fishhook guided by the fishhook guide member,
  a bait moving component having a pressing portion close to the guide rod, and causing the pressing portion to move along the guide rod towards the fishhook side.

Invention Effect

By use of the bait hooking device of the present disclosure, there is no need for directly touching live baits such as an earthworm and a seaworm, and the live bait can be quickly and easily hung on the fishhook.

DESCRIPTION OF THE EMBODIMENTS

The summary of the present implementation mode is illustrated. A bait hooking device 1 is composed of the following parts: clamping portions 23, 33 having comb teeth 232, 332 that constrain a bait F such as an earthworm and are capable of being opened and closed, a guide rod 41 having an opening in the front end 41b and capable of sliding, and a bait moving component 5 which slides on a periphery of the guide rod along the guide rod 41 and has a pressing portion 52. The inner sides of the comb teeth 232, 332 are provided with resisting portions 231, 331 which have a plurality of protrusions on the surfaces to prevent the constrained bait F such as the earthworm from falling off.

The front ends, facing the opening of the front end 41b of the guide rod 41, of the comb teeth 232, 332 are provided with a guide plate 234 that maintains a needle tip of a fishhook N; the outer side of the guide plate 234 is provided with a hook line guide member 233 having hook line slots 233a to 233c for hooking a hook line L of the fishhook N. The guide rod 41 runs through the approximate center of a diameter of the bait F constrained to the inner sides of the comb teeth 232, 332. Then, the needle tip of the fishhook N slides on a rail inserted into the opening of the front end 41b of the guide rod 41 till it protrudes more forward than the guide plate 234 at the front end, and the pressing portion 52 slides, along the periphery of the guide rod 41, till it protrudes more forward than the guide plate 234. Therefore, a user can easily mount the bait F on the fishhook N without directly touching the bait F.

Figure 1:
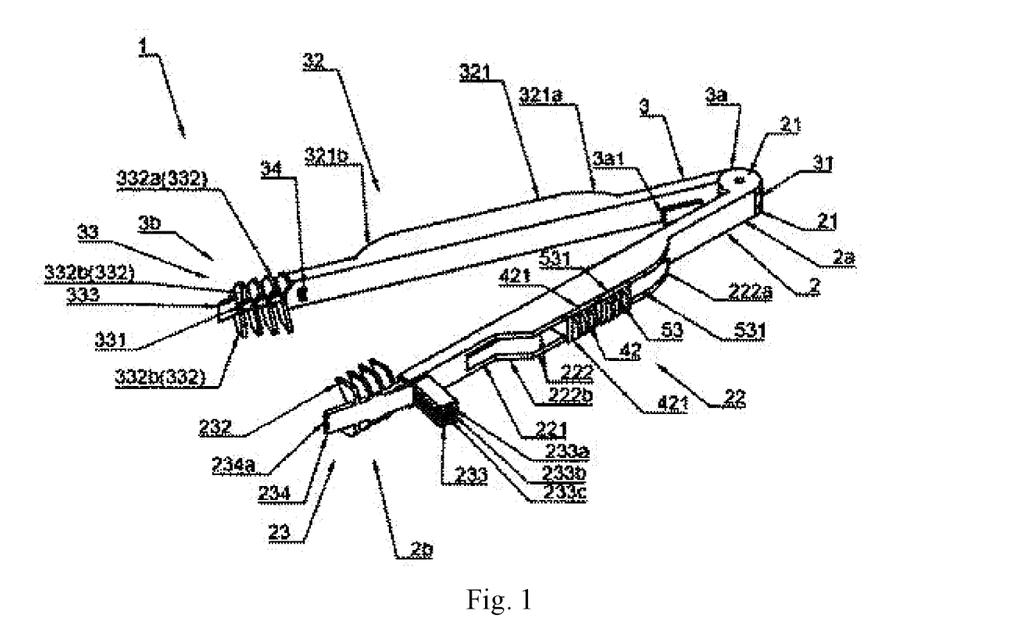
FIG. 1 is an oblique view observed from a first clamping component side of a bait hooking device of the implementation mode of the present disclosure.
Figure 2:
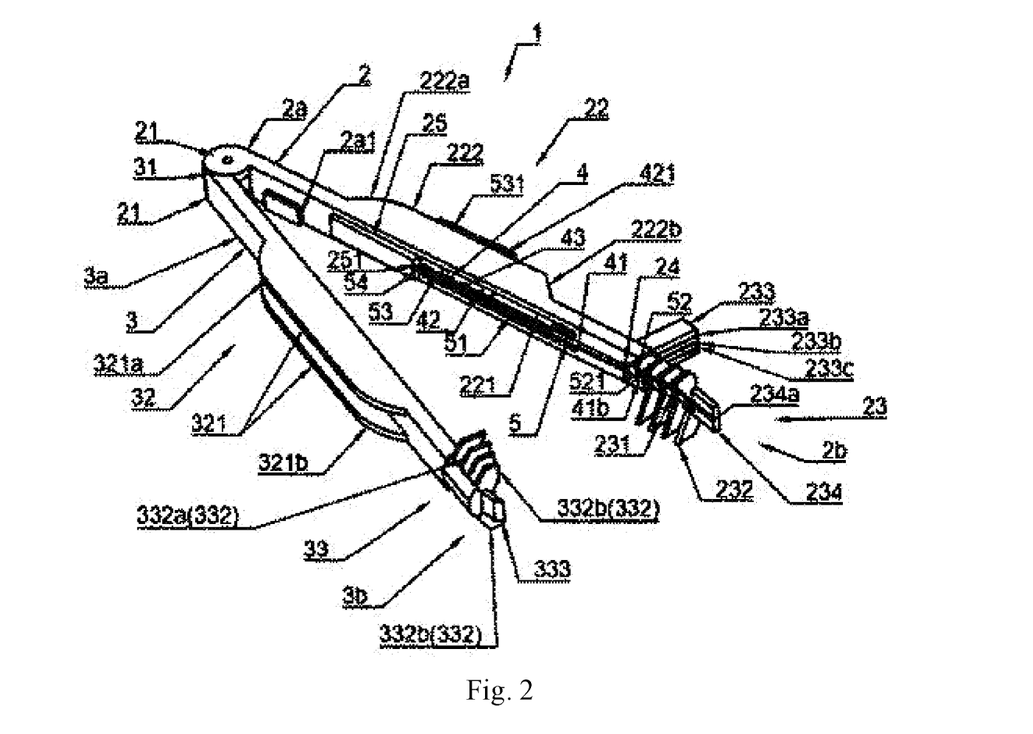
FIG. 2 is an oblique view observed from a second clamping component side of a bait hooking device of the implementation mode of the present disclosure.
Figure 3:
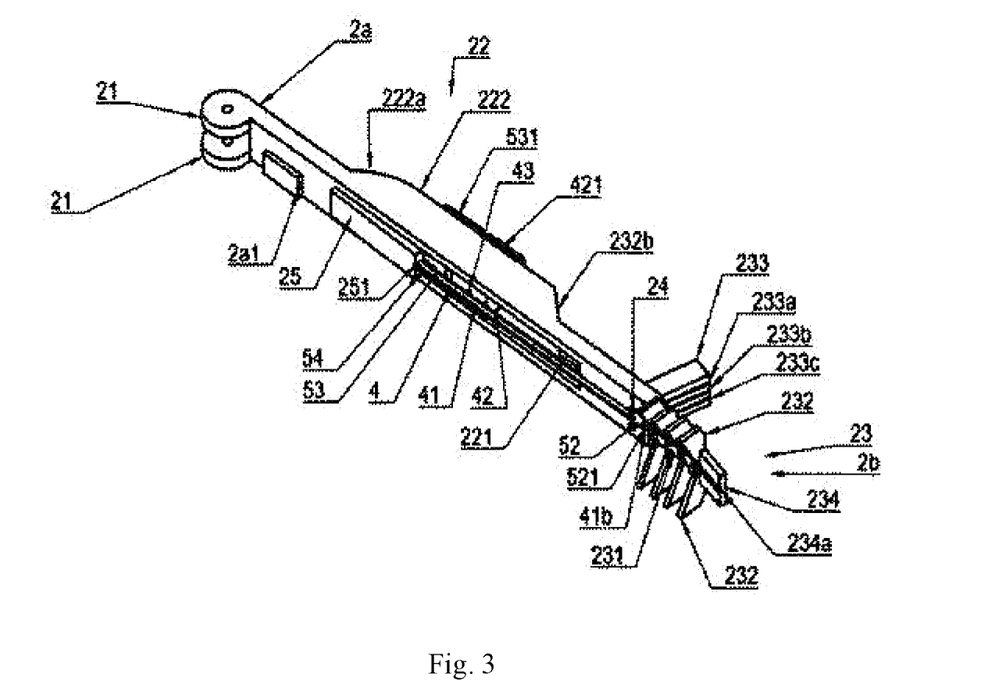
FIG. 3 is an oblique view, observed from the inner side, of a first clamping component side of the implementation mode of the present disclosure.

Then, the specific constitution of the present implementation mode is described with the drawings. FIG. 1 and FIG. 2 are oblique views of the bait hooking device 1. The bait hooking device 1 is provided with a first clamping component 2 and a second clamping component 3. In addition, FIG. 3 is also an oblique view, observed from the inner side, that shows a first clamping component 2 of a bait hooking device 1. It should be noted that in the following descriptions, the start end sides 2a, 3a of the first clamping component 2 and the second clamping component 3 are used as rear sides, and the front end sides 2b, 3b opposite to the start end sides are used as front sides. In addition, the upper side of FIG. 1 is used as an upper side, and a side opposite to the upper side is used as a lower side.

The first clamping component 2 and the second clamping component 3 are provided with an approximately cylindrical rotating shaft 21 and rotating shaft 31 on the start end sides 2a, 3a. By means of axially-loaded cut-in axes arranged on the rotating shafts 21, 31, the start end sides 2a, 3a are connected with the shafts to realize opening and closing. The inner sides of the start end sides 2a, 3a of the first clamping component 2 and the second clamping component 3 are provided with elastic components such as compression coil springs, torsion coil springs and leaf springs in a manner of applying a force to the first clamping component 2 and the second clamping component 3 towards an opening direction.

In the present implementation mode, torsion coil springs are used as elastic components. Two ends of the torsion coil springs are respectively inserted into a clamping hole 2a1 in a rectangular block arranged on the inner surface of the start end side 2a of the first clamping component 2 (referring to FIG. 2) and a clamping hole 3a1 in a rectangular block arranged on the inner surface of the start end side 3a of the second clamping component 3 (referring to FIG. 1) to apply a force to the first clamping component 2 and the second clamping component 3 towards the opening direction. In the case that the elastic component is the compression coil spring or the leaf spring, one end side of the compression coil spring or the leaf spring resists against the inner surface of the start end side 2a of the first clamping component 2, and the other end side resists against the inner surface of the start end side 3a of the second clamping component 3, so as to apply a force to the first clamping component 2 and the second clamping component 3 towards the opening direction.

As shown in FIG. 1 and FIG. 2, the first clamping component 2 and the second clamping component 3 form an approximately rectangular plate of a long size shape. An operating portion 22 is formed on the center side of the first clamping component 2, and a first clamping portion 23 is formed on the front end side 2b of the first clamping component 2. In addition, a holding portion 32 is formed on the center side of the second clamping component 3, and a second clamping portion 33 is formed on the front end side 3b of the second clamping component 3.

Figure 9:
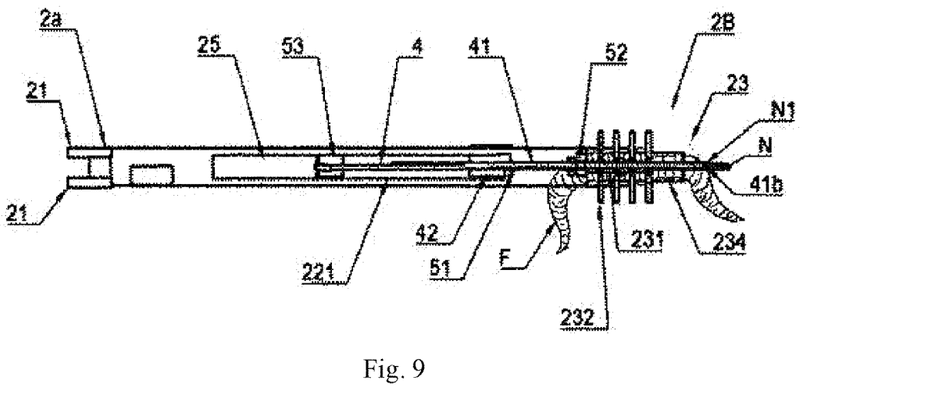
FIG. 9 is a lateral view which shows that a guide rod punctures a bait hung on a bait hooking device of the implementation mode of the present disclosure, and is observed from the inner side of the first clamping component.

A long-rectangular slit 221 of a long size shape is arranged in the approximate center side in the front-back direction of the first clamping component 2 (also referring to FIG. 9). The slit 221 runs through the inside and the outer side of the first clamping component 2. Vertically arranged tabulate guide rails 222 are formed on two side edges of the slit 221 towards the outer side. The guide rails 222 are arranged on the start end side 2a of the first clamping component 2. The guide rails 222 are formed at approximately a certain height along the approximately full length. In addition, the guide rails 222, on the rear end sides (the start end side 2a), have inclined portions 222a which are inclined in a convex arc manner and are connected to the outer surface of the first clamping component 2, and, on the front end sides (the front end side 2b), have inclined portions 222b which are inclined in an approximately linear manner. As shown in FIG. 1, on the two side edges of the front end side of the slit 221, the guide rails 222 are not provided as ends.

The first clamping portion 23 has resisting portions 231 formed on the inner side opposite to the second clamping portion 33 (referring to FIG. 2), comb teeth 232 extending up and down from two sides of the resisting portion 231, and a hook line guide member 233 vertically arranged on the outer surface of the first clamping component 2.

The resisting portions 231 are regions which are arranged between the start end portions of the comb teeth 232 and are of a long size shape in the front-back direction. A plurality of protrusions that realize a slip-resistant function during holding of a bait F (Referring to FIG. 7 and the like) are formed on the resisting portions 231. In addition, the front ends of the resisting portions 231 are provided with long-rectangular guide plates 234. The guide plates 234 tilt towards the second clamping component 3. In addition, the surfaces, facing the second clamping component 3, of the guide plates 234 are provided, along the front-back direction, with concave arc-shaped fishhook grooves 234a acting as fishhook guide members. The front end of the fishhook N (referring to FIG. 6 and the like) can be clamped into the fishhook grooves 234a, so as to stably dispose the fishhook.

Seen from the front, the comb teeth 232 form an approximately right triangle-shaped plate. The front end of each comb tooth 232 is configured to be closer to the second clamping portion 33 than the start end side. The first clamping portion 23 of the present implementation mode is configured to cause totally eight comb teeth 232 to be in longitudinal symmetry relative to every four resisting portions 231.

Figure 5:
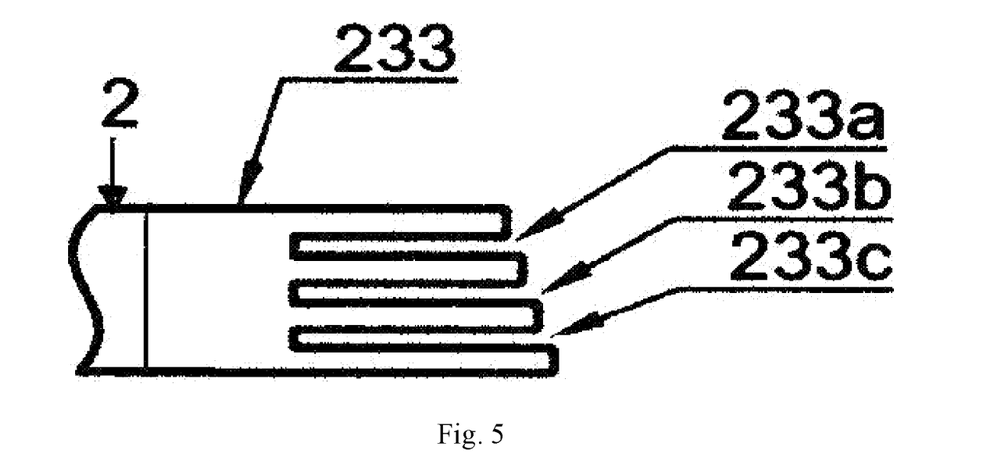
FIG. 5 is a diagram showing a constitution of a hook line guide member of a first clamping component of the implementation mode of the present disclosure.

The overall hook line guide member 233 is of an approximately quadrangular shape. A plurality of sections of hook line slots 233a to 233c are formed in the hook line guide member 233 in the up-down direction. As shown in FIG. 5, the hook line slots 233a to 233c are formed, in a manner of hooking the hook line, as a plurality of notches away from the first clamping component 2 at different heights, i.e. having different slot depths. For example, the hook line slot 233a is set to be away from the first clamping component 2 at a smallest height, i.e. it is set to have the smallest slot depth, and the adjacent hook line slot 233b is set to be away from the first clamping component 2 at a greater height than the hook line slot 233a, i.e. the slot depth is set to be greater. The adjacent hook line slot 233c is further set to be away from the first clamping component 2 at a greater height than the hook line slot 233b, i.e. the slot depth is set to be greater.

Two tabulate supporting plates 321 which are vertically arranged from two side edges of the second clamping component 3 to the outside are formed by separation. The supporting plates 321 are provided at positions that are approximately the same as the anteroposterior positions of the guide rails 222 in the top view, and the positions are at the approximate center of the second clamping component 3 in the front-back direction. The supporting plates 321 are formed away from the second clamping component 3 at an approximately fixed height along the approximately full length. In addition, the supporting plates 321, on the rear sides (the start end side 3a), have inclined portions 321a which are inclined in a convex arc manner and are connected to the outer surface of the second clamping component 3, and, on the front end sides (the front end side 3b), have inclined portions 321b which are inclined in a convex curved manner and are connected with the outer surface of the second clamping component 3.

The second clamping portion 33 has resisting portions 331 formed on the inner side opposite to the first clamping portion 23 (referring to FIG. 1), and comb teeth 332 extending up and down from two sides of the resisting portions 331. The resisting portions 331 are regions which are arranged between the start end portions of the comb teeth 332 and are of a long size shape in the front-back direction. Like the resisting portions 231, a plurality of protrusions that realize a slip-resistant function during holding of the bait F are formed on the resisting portions 331.

The comb teeth 332 include four approximately right trapezoid-shaped comb teeth 332a and four home plate-shaped approximately pentagonal comb teeth 332b. The front end of each comb tooth 332a, 332b is configured to be closer to the first clamping portion 23 than the start end side, so that the comb tooth is flared in the up-down direction. Seen from the front, for the comb teeth 332a, two of them are provided above in an extending manner, and two of them are provided below in an extending manner. The comb teeth 332a respectively extend obliquely in an approximately oblique angle of 45 degrees. The comb teeth 332b are provided on the front sides of the comb teeth 332a. Seen from the front, two of them are provided above in an extending manner, and two of them are provided below in an extending manner. The comb teeth 332b extend respectively to an approximately oblique angle of 45 degrees. Therefore, for the second clamping portion 33, there are totally four comb teeth 332a, every two of which are in longitudinal symmetry relative to the resisting portions 331, and there are totally four comb teeth 332b, every two of which are in longitudinal symmetry relative to the resisting portions 331.

In addition, the comb teeth 232 of the first clamping portion 23 and the comb teeth 332 of the second clamping portion 33 are configured as follows: the comb teeth are staggered in the front-back direction in an intersection manner if the first clamping component 2 and the second clamping component 3 are closed (also referring to FIG. 7 and the like).

The front ends of the resisting portions 331 are provided with long-rectangular guide plates 333. The guide plates 333 tilt towards the first clamping component 2. The guide plates 333 are shorter than the guide plates 234, and the front ends of the guide plates 333 are configured to be closer to the rear side than the front ends of the guide plates 234 (referring to FIG. 7).

As shown in FIG. 2, a bait guide component 4 and a bait moving component 5 which can move back and forth on the front end sides 2b and the start end sides 2a of the first clamping component 2 are arranged between the first clamping component 2 and the second clamping component 3.

The bait guide component 4 moves back and forth in a manner of piercing the approximate center of the bait F such as the earthworm and a clam worm that is clamped by the first clamping portion 23 and the second clamping portion 33, and has a guide rod 41 for supporting the position of the bait F. The guide rod 41 of the present implementation mode is formed as a thin cylindrical guide tube made of metal and the like. The front end 41b in the front is provided with an opening clamped to the front end N1 of the fishhook N. The guide rod 41 can be set to be an injection needle-like guide tube, for example. The front end 41b can be provided with an inclined cutting surface inclined at an injection needle-like oblique angle. The front end 41b of the guide rod 41 is limited to shake up and down by a sliding guide member 24 that is vertically provided in an approximately V-shaped manner on the inner surface of the first clamping component 2. It should be noted that a V-shaped protrusion 34 can also be formed on the inner surface of the second clamping component 3 in a manner of being opposite to the sliding guide member 24.

The first clamping component 2 has a cuboid sliding supporting component 25 that is of a long size shape in the front-back direction behind the slit 221 in the inner surface side. The sliding supporting component 25 has a guide hole 251 running through from the front to the back. The guide hole 251 is an approximately slot hole in the sectional view, and the approximately slot hole in the sectional view takes the left-right direction, i.e. a direction from the side of the first clamping component 2 to the side of the second clamping component 3 (a direction from the inner surface side of the first clamping component 2 to the inner surface side of the second clamping component 3) as a long size shape direction. Therefore, the guide rod 41 can shake in the left-right direction, i.e. the direction from the side of the first clamping component 2 to the side of the second clamping component 3, and can slide back and forth. However, the shake of the guide rod 41 in the left-right direction, i.e. the direction from the side of the first clamping component 2 to the side of the second clamping component 3, is limited according to clamping positions of a first operation component 42 and the guide rails 222, as described below. It should be noted that the guide hole 251 can be set to have a larger inner diameter closer to the front end side in the long size shape direction and have a smaller inner diameter closer to the rear end side in the long size shape direction (i.e. nearly forming a circle). Since the inner diameter continuously changes, the shake amount of the guide rod 41 can be set to be larger when it moves more forward.

The guide rod 41 is connected with the first operation component 42 provided on the outer side surface of the first clamping component 2. The first operation component 42 is formed as an approximately T-shaped block in the sectional view. The first operation component 42 and the guide rod 41 are connected through a short cylindrical connection rod 43 (referring to FIG. 2). The first operation component 42 is inserted into the slit 221 in a run-through manner. In the state of FIG. 1, the first operation component 42 is provided between the upper and lower guide rails 222. The first operation component 42 has guardrail portions 421 extending from the two guide rails 222. The guardrail portions 421 are clamped on the end edges of the guide rails 222 to limit the guide rod 41 to move towards the second clamping component 3. In addition, the exposed surface of the first operation component 42 (the outer surface side of the first clamping component 2) is concave-convex to prevent sliding during front-back operation with fingers.

Figure 4:
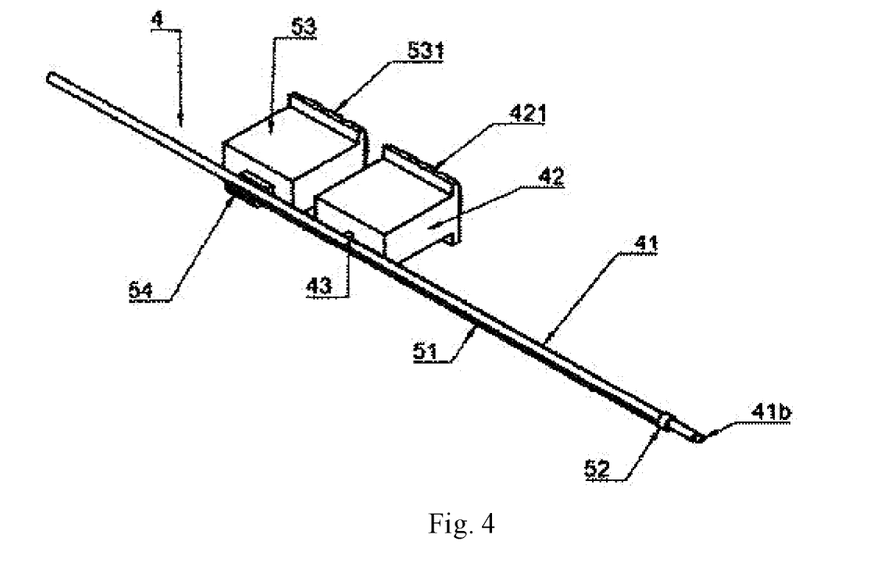
FIG. 4 is an oblique view which shows a constitution of the inner side of a first clamping component of the implementation mode of the present disclosure and is observed from a second clamping component side.

The bait moving component 5 has a rodlike supporting rod 51 that is of a long size shape and is approximately parallel and adjacent to the guide rod 41, a circular-ring-like pressing portion 52 provided at the front end of the supporting rod 51, and a second operation component 53 connected, behind the pressing portion 52, with the supporting rod 51. The pressing portion 52 of the present implementation mode has a through hole 521 which runs through the center side from the front to the back; and the guide rod 41 is inserted into the through hole 521 in a run-through manner, so that the through hole 521 is closer to the periphery of the guide rod 41 (referring to FIG. 4).

The second operation component 53 and the first operation component 42 are also formed as approximately T-shaped blocks in the sectional view. The second operation component 53 is connected with a supporting seat 54 via the rear end of the supporting rod 51. The second operation component 53 is inserted into the slit 221 in a run-through manner on the rear side of the first operation component 42. In the state of FIG. 1, the second operation component 53 is provided between the upper and lower guide rails 222. The second operation component 53 has guardrail portions 531 extending from the two guide rails 222. The guardrail portions 531 are clamped on the end edges of the guide rails 222. In addition, the exposed surface of the second operation component 53 (the outer surface side of the first clamping component 2) is concave-convex to prevent sliding during front-back operation with fingers.

The bait moving component 5 can relatively move back and forth along the bait guide component 4. The movement towards the rear side of the bait moving component 5 is limited by the resistance of the second operation component 53 against the inner edge of the rear end of the slit 221, and the movement towards the front side of the bait moving component 5 is limited by the resistance of the second operation component 53 against the first operation component 42. In another aspect, the movement towards the rear side of the bait guide component 4 is limited by the resistance between the first operation component 42 against the second operation component 53, and the movement towards the front side of the bait guide component 4 is limited by the resistance of the second operation component 42 against the inner edge of the front end of the slit 221.

Figure 6:
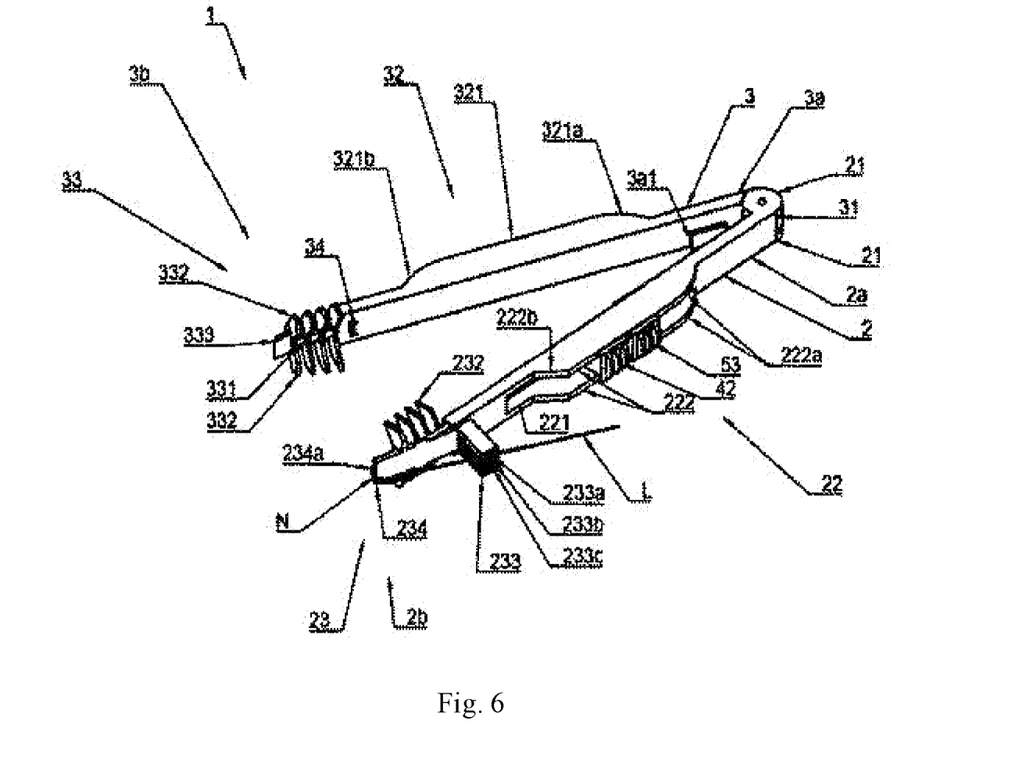
FIG. 6 is a diagram showing a state that a fishhook is arranged on a bait hooking device of the implementation mode of the present disclosure.

Then, a use case of the bait hooking device 1 of the present implementation mode is described with reference to FIG. 6 to FIG. 14. Firstly, in FIG. 6, the fishhook N with the hook line L is clamped with the fishhook grooves 234*a*. At this time, the first operation component 42 and the second operation component 53 are located on the rear side. If a plurality of tensions are applied on the start end side 2*a* to the hook line L for stretching relative to the hook line slots 233*a* to 233*c* of the hook line guide member 233 to realize clamping, the fishhook N and the hook line L are fixed relative to the first clamping component 2. The heights, i.e. the slot depths, of the hook line slots 233*a* to 233*c* are respectively different, so that the hook line L can select the hook line slots 233*a* to 233*c* to be clamped for adjustment, in such a way of forming an approximately parallel opposite angle of the front end N1 of the fishhook N relative to the guide rod 41. In FIG. 6, the hook line L is clamped to the hook line slot 233*a*.

Figure 7:
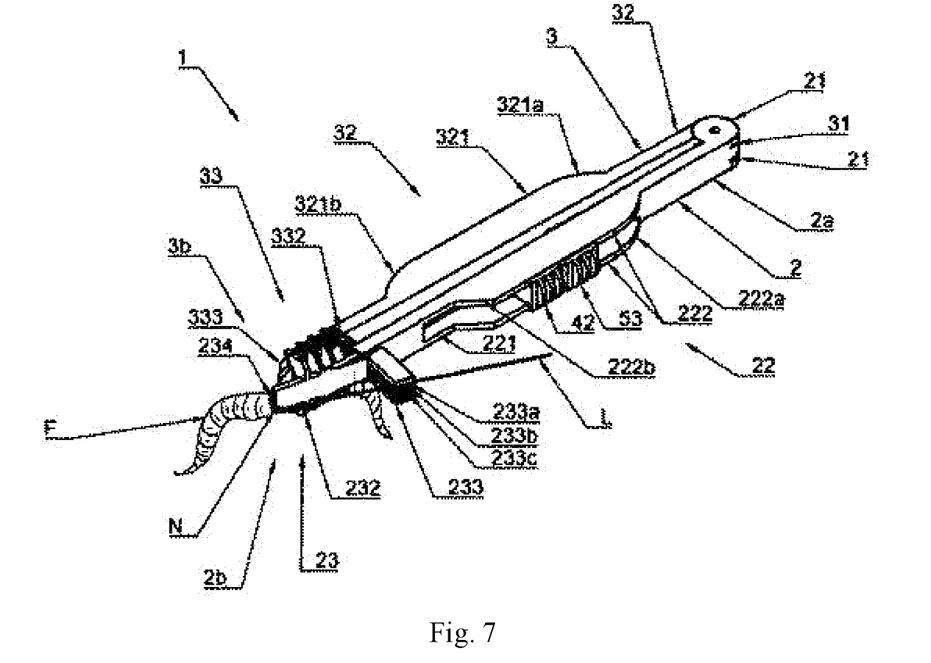
FIG. 7 is a diagram showing a state that a bait is hung on a bait hooking device of the implementation mode of the present disclosure.

In FIG. 7, a user holds the guide rails 222 and the supporting plate 321 to close the first clamping component 2 and the second clamping component 3, so as to clamp the bait F through the first clamping portion 23 and the second clamping portion 33. The bait F is clamped by the resisting portions 231, 331 from the left and the right. At this time, the plurality of protrusions provided on the resisting portions 231, 331 prevent the bait F from sliding off towards the front-back direction. In addition, if the first clamping component 2 and the second clamping component 3 are closed, the top and the bottom of the bait F are closed due to the fact that the comb teeth 232 and the comb teeth 332 are intersected for occlusion. Therefore, the bait F is clamped such that the up, down, left and right movements are all limited. By means of the first clamping component 2 and the second clamping component 3 which are formed like the present implementation, the bait F can also be pinched practically without a hand of the user even if the bait F is a live bait.

Figure 8:
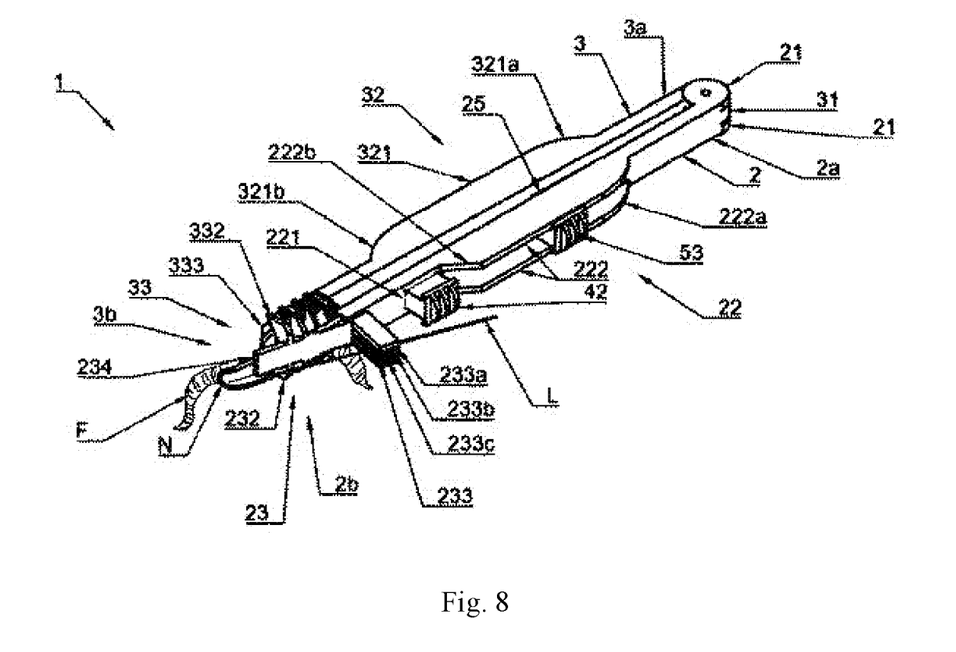
FIG. 8 is a diagram showing a state after a guide rod of a bait hooking device of the implementation mode of the present disclosure moves forwards.

In FIG. 8, the first operation component 42 is caused to slide to the front sides of the guide rails 222 till it moves in front of the inclined portions 222*b*. In this way, as shown in FIG. 9, the guide rod 41 moves forwards to maintain the body of the bait F in a run-through manner. If the guide rod 41 is further caused to move forwards, the front end N1 of the fishhook N is clamped into the opening of the front end 41*b* of the guide rod 41, and the guide rod 41 and the fishhook N are connected in the front-back direction to form an approximately straight line shape.

Figure 10:
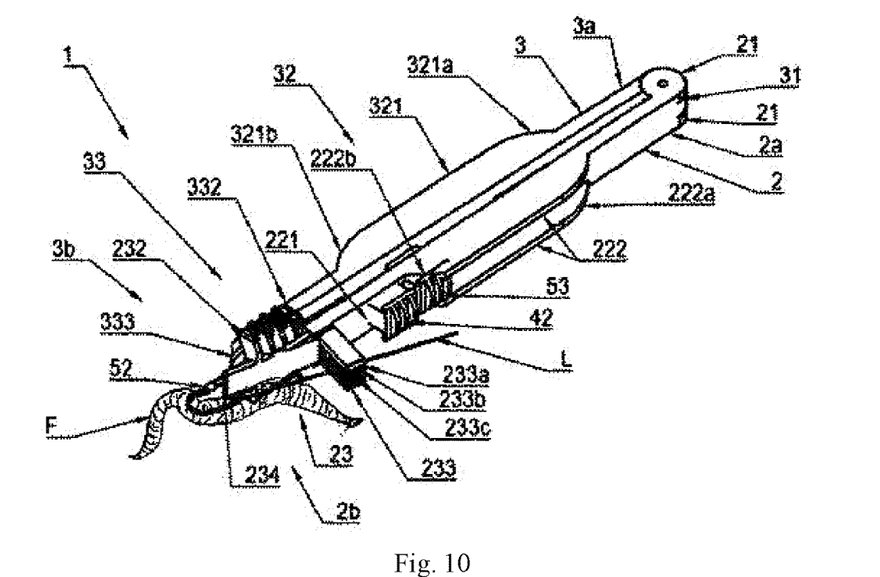
FIG. 10 is a diagram showing a state after a bait moving component of a bait hooking device of the implementation mode of the present disclosure moves forwards.
Figure 11:
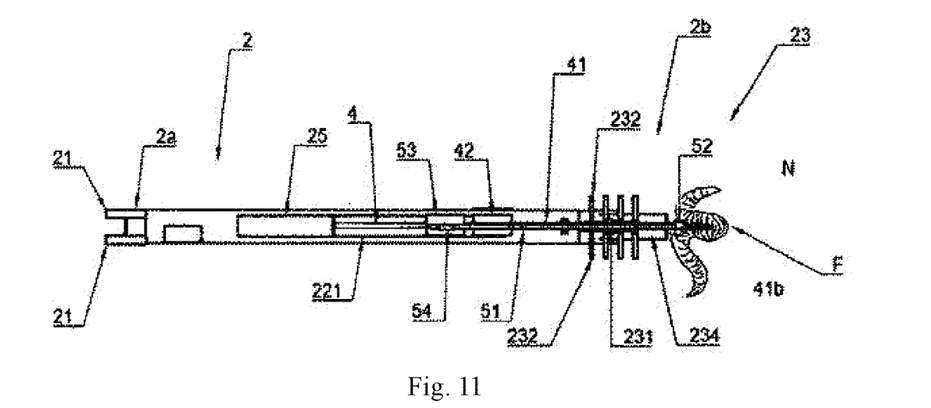
FIG. 11 is a lateral view which shows a state that a bait hung on a bait hooking device of the implementation mode of the present disclosure moves towards a fishhook, and is observed from the inner side of the first clamping component.

As shown in FIG. 10, if the second operation component 53 is caused to slide to the front sides of the guide rails 222, the pressing portion 52 moves along the guide rod 41 to the fishhook N, as shown in FIG. 11, so that the pressed bait F moves along the guide rod 41 to the fishhook N in the front. At this time, since the guide rod 41 and the fishhook N are connected in an approximately straight line manner, the bait F successfully moves from the front end 41*b* of the guide rod 41 to the fishhook N. The forward movement of the second operation component 53 is limited by the resistance against the first operation component 42, so that the pressing portion 52 is limited to not move more forward than the front end 41*b* of the guide rod 41. That is, the length from the first operation component 42 to the front end 41*b* of the guide rod 41 is greater than the length from the second operation component 53 to the pressing portion 52.

In addition, as shown in FIG. 10, if the second operation component 53 is caused to further slide to the front side, the first operation mechanism 42 moves forwards along the inclined portions 222*b*. When the first operation component 42 moves along the inclined portions 222*b*, the front end 41*b* of the guide rod 41 moves along the plate surface of the guide plate 234 inclined towards the second clamping portion 33.

Figure 12:
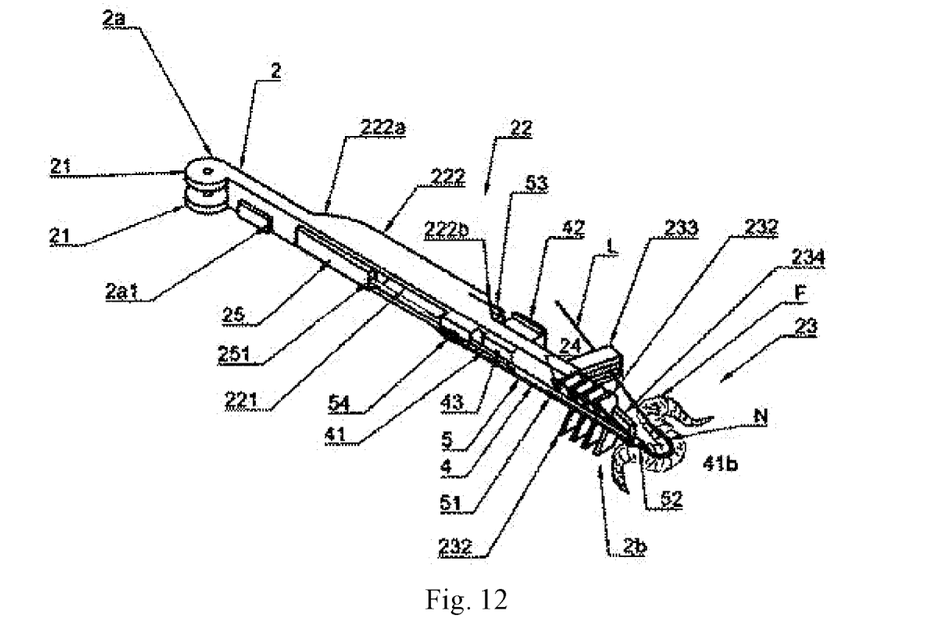
FIG. 12 is an oblique view which shows a state that a bait hung on a bait hooking device of the implementation mode of the present disclosure moves towards a fishhook, and is observed from the inner side of the first clamping component.

Therefore, as shown in FIG. 12, in a state of being clamped to the opening of the guide rod 41, the front end of the fishhook N is pressed towards an inclination direction of the second clamping portion 33 serving as the front end side of the first clamping component 2, and the fishhook N resists against the tension of the hook line L and then is separated from the fishhook grooves 234a. The front end 41b of the guide rod 41 moves more forward than the guide plate 234, so that the front end N1 of the fishhook N can be caused to move to the front side of the guide plate 234.

Figure 13:
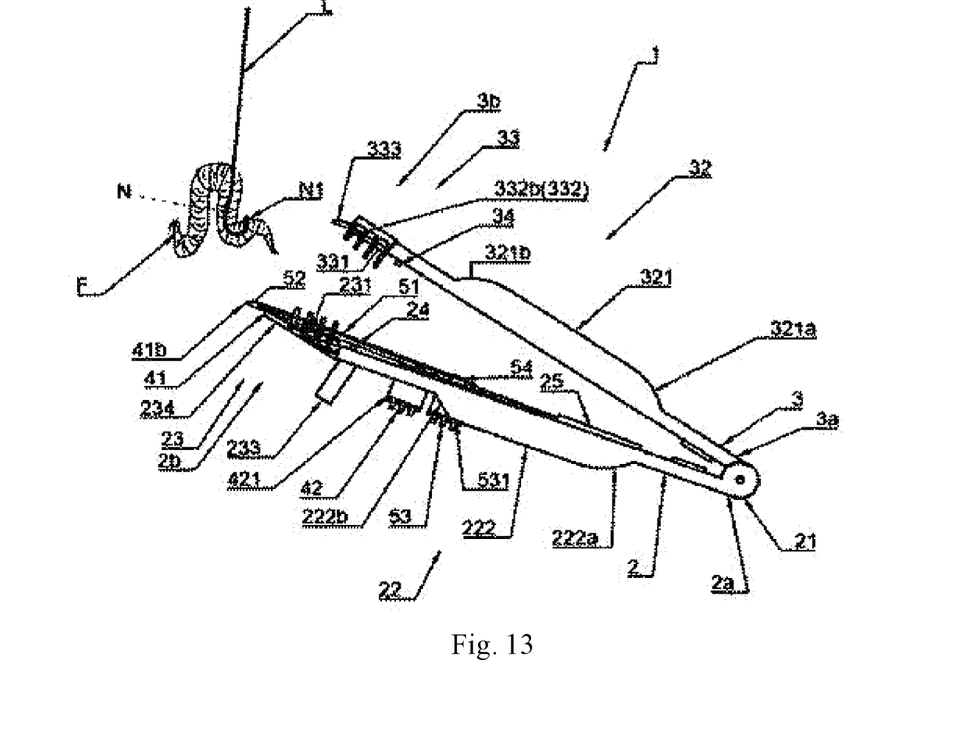
FIG. 13 is a diagram showing a state that a fishhook provided with a bait of the implementation mode of the present disclosure is removed from a bait hooking device.
Figure 14:
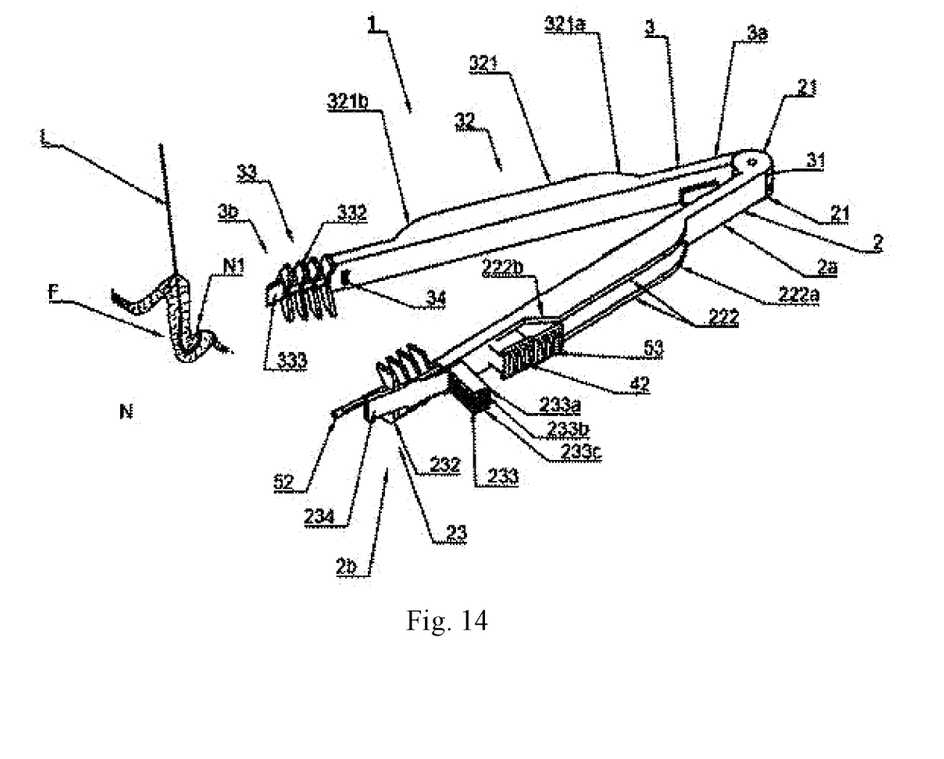
FIG. 14 is another diagram showing a state that a fishhook provided with a bait of the implementation mode of the present disclosure is removed from a bait hooking device.

Then, if the hook line L is removed from the hook line guide member 233, the fishhook N can be removed from the bait hooking device 1 as shown in FIG. 13 and FIG. 14, so that the bait F can be mounted on the fishhook N without directly touching the bait F with a hand. It should be noted that the guide hole 251 of the sliding supporting component 25 is the approximately slot hole in the sectional view, and the approximately slot hole in the sectional view takes the left-right direction, i.e. the direction from the side of the first clamping component 2 to the side of the second clamping component 3 (a direction from the inner surface side of the first clamping component 2 to the inner surface side of the second clamping component 3) as the long size shape direction, so that as shown in FIG. 13, when the guide rod 41 and the fishhook N are separated from the fishhook grooves 234a, the guide rod 41 can be caused to be separated in a manner of being inclined from the fishhook grooves 234a to the second clamping component 3, so as to make its rails staggered. In correspondence to the inclination angle of the guide rod 41 shown in FIG. 13, the guide hole 251 of the sliding supporting component 25 can be inclined in the front-back direction.

REFERENCE NUMERALS

1: bait hooking device;
2: first clamping component
2a: start end side;
2a1: clamping hole
2b: front end;
3: second clamping component
3a: start end side
3a1: clamping hole;
3b: front end
4: bait guide component;
5: bait moving component
21: rotating shaft;
22: operation portion
23: first clamping portion;
24: sliding guide member
25: sliding supporting component;
31: rotating shaft
32: holding portion:
33: second clamping portion
34: V-shaped protrusion;
41: guide rod
41b: front end;
42: first operation component
43: connection rod;
51: supporting rod
52: pressing portion;
53: second operation component
54: supporting seat
221: slit;
222: guide rail
222a: inclined portion;
222b: inclined portion
231: resisting portion;
232: comb tooth
233: hook line guide member;
233a: hook line slot
233b: hook line slot;
233c: hook line slot
234: guide plate;
234a: fishhook groove
251: guide hole;
321: supporting plate
321a: inclined portion;
321b: inclined portion
331: resisting portion;
332: comb tooth
332a: comb tooth;
332b: comb tooth
333: guide plate;
421: guardrail portion
521: through hole;
531: guardrail portion
F: bait;
41: guide rod
L: hook line;
N: hook
N1: front end

What is claimed is:

1. A bait hooking device, provided with:
a first clamping component having a first clamping portion and a fishhook guide member on a front end side,
a second clamping component connected with the first clamping component and the front end side to enable opening and closing by a shaft and provided with a second clamping portion on the front end side,
a guide rod provided between the first clamping component and the second clamping component and configured to maintain a bait therewith, the guide rod being clamped between the first clamping portion and the second clamping portion, and configured to move forward while being clamped with a fishhook guided by the fishhook guide member,
a bait moving component having a pressing portion adjacent to the guide rod, and configured to urge the pressing portion to move along the guide rod towards a fishhook side.

2. The bait hooking device according to claim 1, wherein the fishhook guide member is formed with an opening defined in the front end of the guide rod, the fishhook guide member being configured to clamp the front end of the fishhook via the opening.

3. The bait hooking device according to claim 2, wherein the first clamping portion has a guide plate with an inclined portion;
the fishhook guide member contains fishhook grooves formed in the guide plate.

4. The bait hooking device according to claim 3, wherein the guide rod is connected with a first operation component which moves back and forth along guide rails formed on the outer side surface of the first clamping component;
the first operation component moves along inclined portions formed in front of the guide rails, so that a front end of the guide rod is caused to move obliquely along the guide plate.

5. The bait hooking device according to claim 4, wherein the bait moving component, in the guide rails, has the second operation component provided on the front side of the first operation component.

6. The bait hooking device according to claim 3, wherein the first clamping portion has resisting portions provided with a plurality of protrusions, and a plurality of comb teeth;
the second clamping portion has resisting portions provided with a plurality of protrusions, and a plurality of comb teeth.

7. The bait hooking device according to claim 3, provided with a hook line guide member formed on the outer side surface of the first clamping component;
the hook line guide member has a plurality of sections of hook line slots away from the first clamping component at different heights.

8. The bait hooking device according to claim 1, wherein the first clamping portion has a guide plate with an inclined portion;
the fishhook guide member contains fishhook grooves formed in the guide plate.

9. The bait hooking device according to claim 8, wherein the guide rod is connected with a first operation component which moves back and forth along guide rails formed on the outer side surface of the first clamping component; the first operation component moves along inclined portions formed in front of the guide rails, so that a front end of the guide rod is caused to move obliquely along the guide plate.

10. The bait hooking device according to claim 9, wherein the bait moving component, in the guide rails, has the second operation component provided on the front side of the first operation component.

11. The bait hooking device according to claim 1, wherein the first clamping portion has resisting portions provided with a plurality of protrusions, and a plurality of comb teeth;
the second clamping portion has resisting portions provided with a plurality of protrusions, and a plurality of comb teeth.

12. The bait hooking device according to claim 1, provided with a hook line guide member formed on an outer side surface of the first clamping component;
the hook line guide member has a plurality of sections of hook line slots away from the first clamping component at different heights.

* * * * *